United States Patent
Nakano et al.

(10) Patent No.: US 7,979,915 B2
(45) Date of Patent: Jul. 12, 2011

(54) RECORDING DEVICE, REPLAY DEVICE, INTEGRATED CIRCUIT, AND CONTROL PROGRAM

(75) Inventors: Toshihisa Nakano, Osaka (JP); Hideshi Ishihara, Osaka (JP); Kenji Muraki, Osaka (JP); Masayuki Kozuka, Osaka (JP)

(73) Assignee: Panasonic Corporation, Osaka (JP)

( * ) Notice: Subject to any disclaimer, the term of this patent is extended or adjusted under 35 U.S.C. 154(b) by 1015 days.

(21) Appl. No.: 11/883,353

(22) PCT Filed: Feb. 6, 2006

(86) PCT No.: PCT/JP2006/301979
§ 371 (c)(1),
(2), (4) Date: Jul. 31, 2007

(87) PCT Pub. No.: WO2006/082961
PCT Pub. Date: Aug. 10, 2006

(65) Prior Publication Data
US 2008/0152137 A1    Jun. 26, 2008

Related U.S. Application Data

(60) Provisional application No. 60/650,132, filed on Feb. 7, 2005.

(51) Int. Cl.
  *G06F 11/30*  (2006.01)
  *G06F 12/14*  (2006.01)
  *G11B 7/24*   (2006.01)
  *G11B 23/03*  (2006.01)
(52) U.S. Cl. ............................ 726/30; 713/189; 720/719
(58) Field of Classification Search .................... 726/30; 713/189; 720/719
See application file for complete search history.

(56) References Cited

U.S. PATENT DOCUMENTS

| 6,081,785 | A  | 6/2000 | Oshima et al. |
| 6,118,873 | A  | 9/2000 | Lotspiech et al. |
| 6,609,116 | B1 | 8/2003 | Lotspiech |
| 6,650,753 | B1 | 11/2003 | Lotspiech et al. |

(Continued)

FOREIGN PATENT DOCUMENTS

EP    0 802 527    10/1997

(Continued)

OTHER PUBLICATIONS

Supplementary European Search Report issued Jul. 9, 2009 in EP 06 71 3122.

(Continued)

*Primary Examiner* — Christian LaForgia
(74) *Attorney, Agent, or Firm* — Wenderoth, Lind & Ponack, L.L.P.

(57) ABSTRACT

A recording device performs recording on a recording medium such as a DVD, and playback compatibility of the recording medium is increased. In circumstances such as when a standard is established after the manufacture of a playback apparatus, there are playback devices that physically cannot read information for decrypting encrypted data from a predetermined area of the recording medium due to the specifications of the playback apparatus, and therefore the playback apparatus cannot use the recording medium. In order for the recording medium to be able to be used in such a playback apparatus, the recording device reads data recorded in the predetermined area of the recording medium, and records the read data in another area that is readable by the playback apparatus.

3 Claims, 7 Drawing Sheets

U.S. PATENT DOCUMENTS

| | | |
|---|---|---|
| 6,738,878 B2 | 5/2004 | Ripley et al. |
| 6,738,904 B2 | 5/2004 | Linnartz et al. |
| 6,782,190 B1 * | 8/2004 | Morito ............................ 386/94 |
| 6,832,319 B1 * | 12/2004 | Bell et al. ...................... 713/193 |
| 6,883,097 B1 | 4/2005 | Lotspiech et al. |
| 6,912,634 B2 | 6/2005 | Ripley et al. |
| 6,938,162 B1 * | 8/2005 | Nagai et al. .................... 713/189 |
| 6,973,015 B1 | 12/2005 | Murakami et al. |
| 7,111,175 B2 | 9/2006 | Ripley |
| 7,155,591 B2 | 12/2006 | Ripley et al. |
| 7,823,212 B2 * | 10/2010 | Yamamichi et al. ............ 726/30 |
| 2002/0025039 A1 | 2/2002 | Kato et al. |
| 2002/0087814 A1 * | 7/2002 | Ripley et al. ................... 711/154 |
| 2002/0087818 A1 * | 7/2002 | Ripley et al. ................... 711/164 |
| 2002/0087871 A1 | 7/2002 | Ripley |
| 2002/0106087 A1 | 8/2002 | Lotspiech et al. |
| 2002/0141576 A1 | 10/2002 | Ripley et al. |
| 2004/0168076 A1 | 8/2004 | Linnartz et al. |
| 2004/0172549 A1 | 9/2004 | Kojima et al. |
| 2004/0205315 A1 * | 10/2004 | Ripley et al. ................... 711/163 |
| 2006/0153378 A1 | 7/2006 | Lotspiech et al. |
| 2008/0310292 A1 | 12/2008 | Nagai et al. |

FOREIGN PATENT DOCUMENTS

| | | |
|---|---|---|
| EP | 0 997 899 | 5/2000 |
| EP | 1 058 254 | 12/2000 |
| JP | 2000-76141 | 3/2000 |
| JP | 2003-536193 | 12/2003 |
| JP | 2004-186825 | 7/2004 |
| JP | 2005-502975 | 1/2005 |
| WO | 2005/008656 | 1/2005 |
| WO | 2006/074987 | 7/2006 |

OTHER PUBLICATIONS

EMCA-337, Data Interchange on 120 mm and 80 mm Optical Disk using + RW Format—Capacity: 4,7 and 1,46 Gbytes per Side, 3rd Edition, Dec. 2005.

EMCA-272, 120 mm DVD Rewritable Disk (DVD-RAM) 2nd Edition, Jun. 1999.

* cited by examiner

FIG. 3

| | DESCRIPTION | NOMINAL RADIUS IN mm |
|---|---|---|
| INNER DRIVE AREA | INITIAL ZONE | start 22.000 mm |
| | INNER DISK TEST ZONE | start 22.616 mm |
| | COUNT ZONE RUN-IN | start 23.052 mm |
| | INNER DISK COUNT ZONE | start 23.079 mm |
| | INNER DISK ADMINISTRATION ZONE | start 23.186 mm |
| | TABLE OF CONTENTS ZONE | start 23.293 mm |
| LEAD-IN | GUARD ZONE 1 | start 23.400 mm |
| | RESERVED ZONE 1 | |
| | RESERVED ZONE 2 | |
| | INNER DISK IDENTIFICATION ZONE | |
| | RESERVED ZONE 3 | |
| | REFERENCE CODE ZONE | start 23.896 mm |
| | BUFFER ZONE 1 | |
| | CONTROL DATA ZONE | |
| | BUFFER ZONE 2 | |
| DATA | DATA ZONE | start 24.000 mm |
| LEAD-OUT | BUFFER ZONE 3 | start 58.000 mm (AT FULL CAPACITY) |
| | OUTER DISK IDENTIFICATION ZONE | |
| | GUARD ZONE 2 | |
| OUTER DRIVE AREA | OUTER DISK ADMINISTRATION ZONE | start 58.053 mm |
| | OUTER DISK COUNT ZONE | start 58.096 mm |
| | OUTER DISK TEST ZONE | start 58.139 mm |
| | GUARD ZONE 3 | start 58.310 mm end ≧ 58.500 mm |

PRE-RECORD
(BCA)
MEDIA ID
MKB VALIDATION DATA

MKB

RECORD
MEDIA ID
MKB

RECORDING DEVICE, REPLAY DEVICE, INTEGRATED CIRCUIT, AND CONTROL PROGRAM

This application claims benefit to the provisional U.S. Application No. 60/650,132, filed Feb. 7, 2005.

BACKGROUND OF THE INVENTION

1. Field of Invention

The present invention relates to a recording device that records data onto a recording medium, and in particular to technology for improving the playback compatibility of recording media.

2. Description of the Related Art

DVDs, on which content such as a movie can be recorded in high quality, are widely used as package media for distributing content. Content is recorded onto DVDs as digital data. Compared to analog data, digital data undergoes much less degradation during copying, and the value of the content is diminished very little by copying. If recording media containing unauthorized copies of content are distributed to the market at cheap prices, the number of consumers who purchase legitimate package media falls, and there is the fear that holders of rights such as copyrights on content will incur extensive losses.

For this reason, copyright protection technology such as CPRM (Content Protection for Recordable media) is used to protect the rights of right-holders. CPRM is copyright protection technology used when recording content or other data to a writable recording medium. A recording device encrypts the data before recording it to the recording medium, in order to prevent unauthorized copying of the data. Here, the data is encrypted using information prerecorded in a predetermined area of the recording medium. Taking the example of the DVD-RAM standard, the recording device encrypts the data with use of an MKB (Media Key Block) recorded in an Initial Zone of the recording medium, a media ID recorded in a BCA (Burst Cutting Area), and the like.

Note that regarding disk layouts in DVD standards, the disk layouts of the DVD+RW standard and the DVD-RAM standard are described in non-patent documents 1 and 2 respectively.

Non-patent document 1: ECMA-337, 3rd Edition—December, 2005.

Non-patent document 2: ECMA-272, 2nd Edition—June, 1999.

BRIEF SUMMARY OF THE INVENTION

Problems Solved by the Invention

As described in the above non-patent documents, the disk layout is different depending on the DVD standard. Since there are cases in which the recording positions of data are different depending on the disk layout, it is possible that a playback device will not be able to utilize a recording medium on which data has been recorded according to an incompatible standard. For this reason, manufacturers normally design their playback devices to be compatible with as many established standards as possible, such that there is no detriment to users of their playback devices.

However, when a standard is established after a playback device has been manufactured, it is possible that the playback device will not be able to decrypt encrypted data that has been recorded on a recording medium according to the newly established standard, due to specification-related constraints of the playback device.

For example, if the media ID and other decryption information used in processing for decrypting the encrypted data is recorded in an inner circumferential portion of a disk-shaped recording medium, and a reading unit of a playback device for reading data from the recording medium physically cannot read the inner circumferential portion of the disk, the playback device will not be able to decrypt the encrypted data the decryption information. Given that in this case the information necessary for decrypting the encrypted data physically cannot be read, a countermeasure such as updating a playback processing program of the playback device would have no effect. This is not preferable since the inability to utilize the data on the recording medium is not only a detriment to the user of the playback device, but also diminishes the number of choices of methods by which a content holder can distribute their content to potential content users.

Therefore, an aim of the present invention is to provide a recording device that records data to a recording medium in such away that even a playback device incompatible with a standard of the recording medium due to specification-related constraints can utilize the data that has been recorded onto the recording medium according to the standard.

Means to Solve the Problems

In order to solve the above problem, the present invention is a recording device that performs recording on a recording medium, such that a first area of the recording medium has prerecorded therein decryption information used in decryption processing for decrypting encrypted data, the recording device including: a read unit operable to read the decryption information from the first area; and a record unit operable to record the read decryption information in a second area of the recording medium, the second area being readable by a device that physically cannot read data in the first area.

Effects of the Invention

According to this structure, the recording device reads the decryption information from the first area, and records the read decryption information to the second area.

Accordingly, even a device that physically cannot read data from the first area of the recording medium will be able to decrypt the encrypted data recorded on the recording medium since the device can read the decryption information from the second area.

If some kind of information is recorded in the second area, and furthermore the information is illegitimate decryption information, the playback device can decrypt the encrypted data with use of the illegitimate decryption information, whereby it is possible that the rights of a right-holder are not sufficiently protected. Also, if the decryption information recorded in the second area has been corrupted due to a recording failure or another reason, the playback device cannot decrypt the encrypted data.

Here, the recording device may further include: a detection unit operable to detect that certain information is recorded in the second area; a determination unit operable to, if the certain information is recorded in the second area, determine whether the decryption information recorded in the first area and the certain information are identical; and an overwrite unit operable to, when the determination unit has determined that the decryption information and the certain information are not identical, overwrite the certain information in the second area with the decryption information.

This structure enables reliably recording legitimate decryption information in the second area.

Also, the decryption information may be a key block.

Also, the decryption information may be a media ID that identifies the recording medium.

Also, the second area may be a buffer area included in a lead-in area of the recording medium.

Also, the first area may be an initial zone of the recording medium.

Also, the present invention is an integrated circuit used in a recording device that performs recording on a recording medium, a first area of the recording medium having prerecorded therein decryption information used in decryption processing for decrypting encrypted data, the integrated circuit including: a read processing unit operable to perform processing for reading the decryption information from the first area; and a record processing unit operable to perform processing for recording the read decryption information in a second area of the recording medium, the second area being readable by a device that physically cannot read data in the first area.

Also, the present invention is a control program for causing processing to be executed by a recording device that performs recording on a recording medium, a first area of the recording medium having prerecorded therein decryption information used in decryption processing for decrypting encrypted data, the control program including the steps of: reading the decryption information from the first area; and recording the read decryption information in a second area of the recording medium, the second area being readable by a device that physically cannot read data in the first area.

There are playback devices that can read from both the first and second areas of the recording medium depending on the standard. If the decryption information is recorded in the second area, such playback devices can read the decryption information from either the first or second area.

However, there are cases in which the information recorded in the second area is illegitimate information recorded by an illegitimate recording device. In such cases, decrypting the encrypted data with use of the illegitimate information recorded in the second area of the recording medium is disadvantageous to a holder of a data copyright etc.

Here, the present invention is a playback device that reads encrypted data from a recording medium and controls execution of decryption processing for decrypting the read encrypted data, the recording medium including a first area and a second area, decryption information used in the decryption processing having been prerecorded in the first area before recording of the encrypted data by a recording device, the encrypted data having been generated by encrypting, with use of the decryption information, data targeted for recording, certain information being recorded in the second area, and the playback device including: a determination unit operable to determine whether the decryption information recorded in the first area and the certain information recorded in the second area are identical; and a control unit operable to control execution of the decryption processing, according to a result of the determination.

According to this structure, the playback device determines whether the information recorded in the first and second areas is identical. The execution of the decryption processing is controlled according to the result of the determination.

Accordingly, even if illegitimate information is recorded in the second area, the execution of the decryption processing can be controlled, such that there is no disadvantage to the right-holder etc.

Here, the control unit may execute the decryption processing only when the determination unit has determined that the decryption information recorded in the first area and the certain information recorded in the second area are identical.

According to this structure, in a playback device that can read from both the first and second areas depending on the standard, the decryption processing is performed only if the information recorded in the second area is identical to the decryption information recorded in the first area. Therefore, there is no disadvantage to the right-holder etc. even if illegitimate information is recorded in the second area.

Also, the control unit may suppress the decryption processing when the determination unit has determined that the decryption information recorded in the first area and the certain information recorded in the second area are not identical.

According to this structure, an illegitimate user gains no advantage by recording illegitimate information in the second area, since the decryption processing is suppressed if the information recorded in the second area is illegitimate. This potentially suppresses the recording of illegitimate information in the second area by illegitimate users.

Nonetheless, simply the fact that the information recorded in the second area is not identical to the decryption information recorded in the first area does necessarily mean that the information in the second area was recorded by an illegitimate user. For example, the information recorded in the second area may have been corrupted by degredation of or damage to the recording medium after the decryption information had been recorded in the second area by a legitimate user.

In other words, if the information recorded in the second area is not identical to the decryption information recorded in the first area due to damage to the recording medium etc., the playback device cannot decrypt the encrypted data even though it can read the decryption information from the first area. Therefore, in this case, use of the data on the recording medium is restricted even though the rights of the right-holder etc. are not being violated, which is unfairly disadvantageous to the user of the playback device.

Here, when the determination unit has determined that the decryption information recorded in the first area and the certain information recorded in the second area are not identical, the control unit may execute the decryption processing with use of the decryption information read from the first area.

This structure enables preventing the unfair disadvantage to the user of the playback device in the aforementioned case.

Also, the present invention is an integrated circuit used in a playback device that reads encrypted data from a recording medium and controls execution of decryption processing for decrypting the read encrypted data, the recording medium including a first area and a second area, decryption information used in the decryption processing having been prerecorded in the first area before recording of the encrypted data by a recording device, the encrypted data having been generated by encrypting, with use of the decryption information, data targeted for recording, certain information being recorded in the second area, the integrated circuit including: a determination processing unit operable to perform processing for determining whether the decryption information recorded in the first area and the certain information recorded in the second area are identical; and a control processing unit operable to perform processing for controlling execution of the decryption processing, according to a result of the determination.

Also, the present invention is a control program for causing processing to be executed by a playback device that reads encrypted data from a recording medium and controls execution of decryption processing for decrypting the read encrypted data, the recording medium including a first area and a second area, decryption information used in the decryption processing having been prerecorded in the first area before recording of the encrypted data by a recording device, the encrypted data having been generated by encrypting, with use of the decryption information, data targeted for recording, certain information being recorded in the second area, the control program including the steps of: determining whether the decryption information recorded in the first area and the certain information recorded in the second area are identical; and controlling execution of the decryption processing, according to a result of the determination.

BRIEF DESCRIPTION OF THE DRAWINGS

FIG. 3 shows a disk layout of the recording medium 2000;

DETAILED DESCRIPTION OF THE INVENTION

The following describes an embodiment of a recording device pertaining to the present invention, with reference to the drawings.

Overview

The recording device of the present invention records AV data to a recording medium compatible with CPRM (Content Protection for Recordable Media). Before recording is performed, the AV data is encrypted with use of information prerecorded on the recording medium. Here, the encryption method is CPRM. The information prerecorded on the recording medium includes an MKB (Media Key Block), which is a block of keys, as well as MKB validation data and a media ID.

The MKB is prerecorded in an area of the recording medium called the Initial Zone. The MKB validation data and the media ID are prerecorded in a BCA (Burst Cutting Area) in the Initial Zone.

The recording device encrypts the AV data with use of the MKB, the media ID and the like. Also, in order for a playback device that physically cannot read the MKB, the media ID and the like from the recording medium due to specification-related constraints to be able to decrypt the AV data with use of the MKB etc., the recording device also records the MKB etc. in a predetermined area of the recording medium that is readable by the playback device. This enables the playback device to read the MKB etc. from the recording medium and decrypt the AV data. The present embodiment is an exemplary case in which the recording device records the MKB etc. in a buffer zone 2 of the recording medium.

Furthermore, if information has already been recorded in the buffer zone 2, the recording device verifies whether the recorded information includes the MKB, media ID and the like that are prerecorded in the Initial Zone of the recording medium, and overwrites the MKB, media ID and the like in the buffer zone 2 according to a result of the verification.

Also, the playback device can read the information recorded in the buffer zone 2 of the recording medium, even though it is unable to read the information recorded in the Initial Zone of the recording medium.

The following is a detailed description of the present embodiment.

Structure

Figure 1:
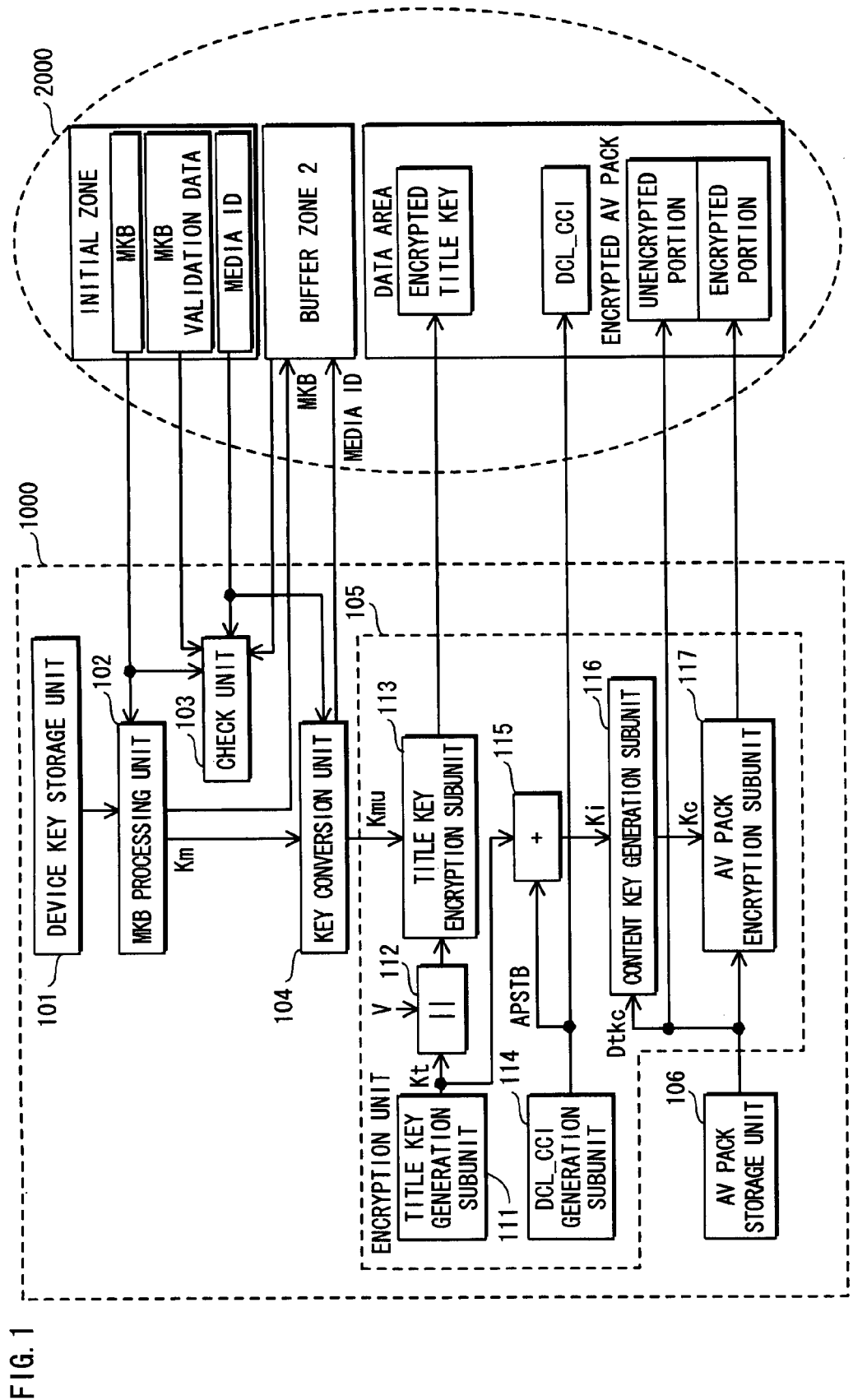
FIG. 1 is a functional block diagram showing a recording device 1000 of the present invention.

FIG. 1 is a functional block diagram showing a recording device 1000 of the present invention. Note that a recording medium 2000 is also shown in FIG. 1.

As shown in FIG. 1, the recording device 1000 includes a device key storage unit 101, an MKB processing unit 102, a check unit 103, a key conversion unit 104, an encryption unit 105, and an AV pack storage unit 106. The encryption unit 105 includes a title key generation subunit 111, a title key combination subunit 112, a title key encryption subunit 113, a DCL_CCI generation subunit 114, an intermediate key generation subunit 115, a content key generation subunit 116, and an AV pack encryption subunit 117.

The device key storage unit 101 stores a device key allocated to the recording device 1000.

The MKB processing unit 102 reads the MKB from the Initial Zone of the recording medium 2000, and generates a media key (Km) by decrypting the read MKB with use of the device key stored in the device key storage unit 101 of the recording device 1000. The MKB processing unit 102 also records the generated media key in the buffer zone 2 of the recording medium 2000.

The check unit 103 calculates a hash value for the MKB recorded in the Initial Zone, and verifies the validity of the MKB by comparing the calculated hash value to the MKB validation data recorded in the BCA. The check unit 103 also detects that some kind of information is recorded in the buffer zone 2, and upon detecting that an MKB is recorded in the buffer zone 2, calculates a hash value for the MKB recorded in the buffer zone 2, and verifies the validity of the MKB recorded in the buffer zone 2 by comparing the calculated hash value to the MKB validation data. Also, upon detecting that a media ID is recorded in the buffer zone 2, the check unit 103 verifies the validity thereof by performing a comparison with the media ID recorded in the BCA. The media ID recorded in the buffer zone 2 is determined to be valid if, for example, a result of the aforementioned comparison is that the media IDs are the same.

The key conversion unit 104 reads the media ID recorded in the BCA, and with use of the read media ID, converts the MKB read by the MKB processing unit 102, thereby generating a unique media key (Kmu). The key conversion unit 104 also records the media ID read from the BCA in the buffer zone 2.

The encryption unit 105 encrypts AV data received as an input from the AV pack storage unit 106 in a 2,048-byte AV pack format, and records the encrypted data in a data area of the recording medium 2000. The AV data encrypted by the encryption unit 105 is recorded in the data area in a 2,048-byte encrypted AV pack format. The first 128 bytes of the 2,048 bytes in the encrypted AV pack make up a plain-text unencrypted portion, and the remaining 1,920 bytes make up an encrypted portion. The first 128 bytes of the 2,048-byte AV pack received as input from the AV pack storage unit 106 are used to generate a content key (Kc) for encrypting the AV data, and are also recorded in the data area as the plain-text unencrypted portion. The encryption unit 105 also encrypts the remaining 1,920 bytes of the 2,048-byte AV pack with use of the content key, and records the generated encrypted data in the data area as the encrypted portion.

The following describes details of the function blocks constituting the encryption unit 105.

The title key generation subunit 111 generates a title key. The title key generation subunit 111 outputs the generated title key (Kt) to the title key combination subunit 112 and the intermediate key generation subunit 115.

The title key combination subunit 112 combines an arbitrary value V and the title key generated by the title key generation subunit 111.

The title key encryption subunit 113 encrypts the title key combined with the arbitrary value V by the title key combination subunit 112, with use of the unique media key generated by the key conversion unit 104, thereby generating an encrypted title key. The title key encryption subunit 113 records the generated encrypted title key in the data area.

The DCL_CCI generation subunit 114 generates copy control information etc. of the AV data as DCL_CCI, and records the generated DCL_CCI in the data area. The DCL_CCI generation subunit 114 also outputs analog protection information (APSTB: Analog Protection Single Trigger Bit) to the intermediate key generation subunit 115.

The intermediate key generation subunit 115 receives the APSTB from the DCL_CCI generation subunit 114, and generates an intermediate key (Ki) by combining the received APSTB with the title key received from the title key generation subunit 111. The intermediate key generation subunit 115 outputs the generated intermediate key to the content key generation subunit 116.

The content key generation subunit 116 receives an input of the first 128 bytes (Dtkc) of the 2,048-byte AV pack, and generates a content key by converting the received intermediate key with use of the received first 128 bytes of the AV pack. Note that as described above, the first 128 bytes of the AV pack are recorded in the data area as the plain-text unencrypted portion.

The AV pack encryption subunit 117 encrypts the remaining 1,920 bytes of the 2,048-byte AV pack with use of the content key generated by the content key generation subunit 116, and records the encrypted data in the data area as the encrypted portion.

The AV pack storage unit 106 stores the AV data.

The following describes a structure of the playback device.

Figure 2:
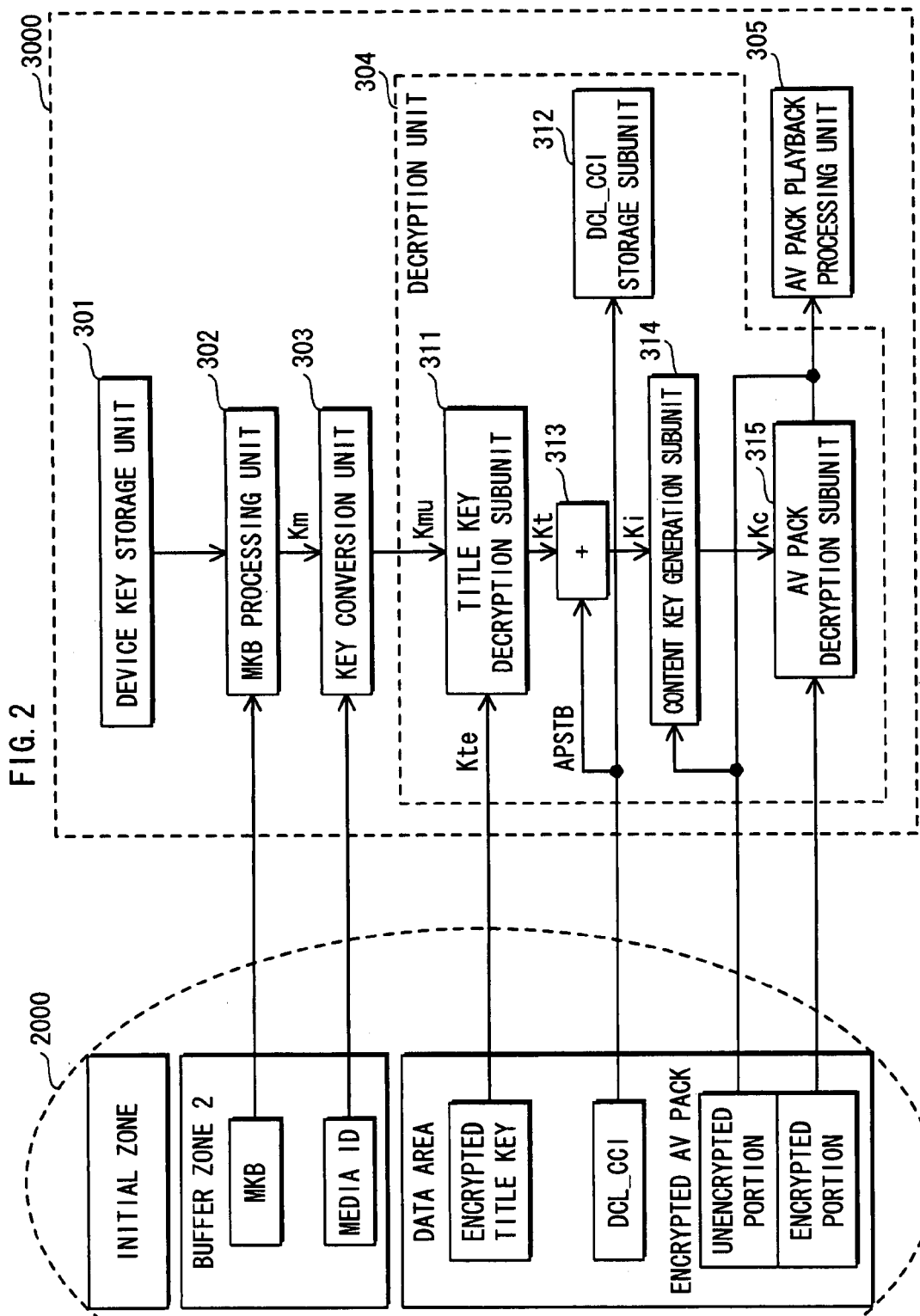
FIG. 2 is a functional block diagram showing a playback device 3000 that reads data from a recording medium 2000 and decrypts the read data.

FIG. 2 is a functional block diagram showing a playback device 3000 that reads data from the recording medium 2000 and performs decryption processing on the read data.

As shown in FIG. 2, the playback device 3000 includes a device key storage unit 301, an MKB processing unit 302, a key conversion unit 303, a decryption unit 304, and an AV pack playback processing unit 305. The decryption unit 304 includes a title key decryption subunit 311, a DCL_CCI storage subunit 312, an intermediate key generation subunit 313, a content key generation subunit 314, and an AV pack decryption subunit 315.

The device key storage unit 301 stores a device key of the playback device 3000.

The MKB processing unit 302 reads the MKB recorded in the buffer zone 2 of the recording medium 2000, and decrypts the read MKB with use of the device key stored by the device key storage unit 301 of the playback device 3000, thereby generating a media key.

The key conversion unit 303 reads the media ID recorded in the buffer zone 2, and with use of the read media ID, converts the media key generated by the MKB processing unit 302, thereby generating a unique media key.

The decryption unit 304 reads the encrypted AV pack from the data area of the recording medium 2000, and decrypts the read encrypted AV pack to obtain the AV data. The decryption unit 304 outputs the obtained AV data to the AV pack playback processing unit 305. The decryption unit 304 also reads the DCL_CCI from the data area and stores the read DCL_CCI.

The following describes details of the function blocks constituting the decryption unit 304.

The title key decryption subunit 311 reads the encrypted title key from the data area of the recording medium 2000, and decrypts the read encrypted title key with use of the unique media key generated by the key conversion unit 303, thereby generating a title key.

The DCL_CCI storage subunit 312 stores the DCL_CCI read from the data area.

The intermediate key generation subunit 313 receives the analog protection information (APSTB) included in the DCL_CCI recorded in the data area, and combines the received analog protection information with the title key generated by the title key decryption subunit 311, thereby generating an intermediate key. The intermediate key generation subunit 313 outputs the generated intermediate key to the content key generation subunit 314.

The content key generation subunit 314 converts the intermediate key received from the intermediate key generation subunit 313, with use of the first 128 bytes of the encrypted AV pack read from the data area, thereby generating a content key.

The AV pack decryption subunit 315 decrypts the remaining 1,920 bytes of the encrypted AV pack with use of the content key generated by the content key generation subunit 314.

The AV pack playback processing unit 305 performs video output and playback processing on the AV data obtained by the decryption unit 304.

Note that although not depicted, the recording device 1000 and the playback device 3000 include a reading unit for reading data from the recording medium 2000. Also, the above constituent elements constitute a computer system composed of specifically a CPU (Central Processing Unit), a ROM (Read Only Memory), a RAM (Random Access Memory), etc., and operate in accordance with a program. A portion of the processing, such as the encryption processing, may be performed by a dedicated processor.

Data

The following describes the disk layout of the recording medium 2000.

FIG. 3 shows the disk layout of the recording medium 2000. Note that the DVD+RW standard is described as an example in the present embodiment.

As shown in FIG. 3, the Initial Zone is included in an inner drive area of the recording medium 2000. A media ID and MKB validation data are prerecorded in the BCA of the Initial Zone. The information recorded in the BCA cannot be tampered with. An MKB is also prerecorded in the Initial Zone. Also, the buffer zone 2 is included in a lead-in area.

In the present embodiment, the recording device 1000 records the MKB and the media ID that were read from the Initial Zone of the recording medium 2000 in the buffer zone 2 of the recording medium 2000. Also, as described above, the playback device 3000 cannot read the information recorded in the Initial Zone, and performs decryption processing using the MKB and the media ID that were recorded in the buffer zone 2 by the recording device 1000.

Operations

The following describes operations performed by the recording device 1000 of the present invention.

Figure 4:
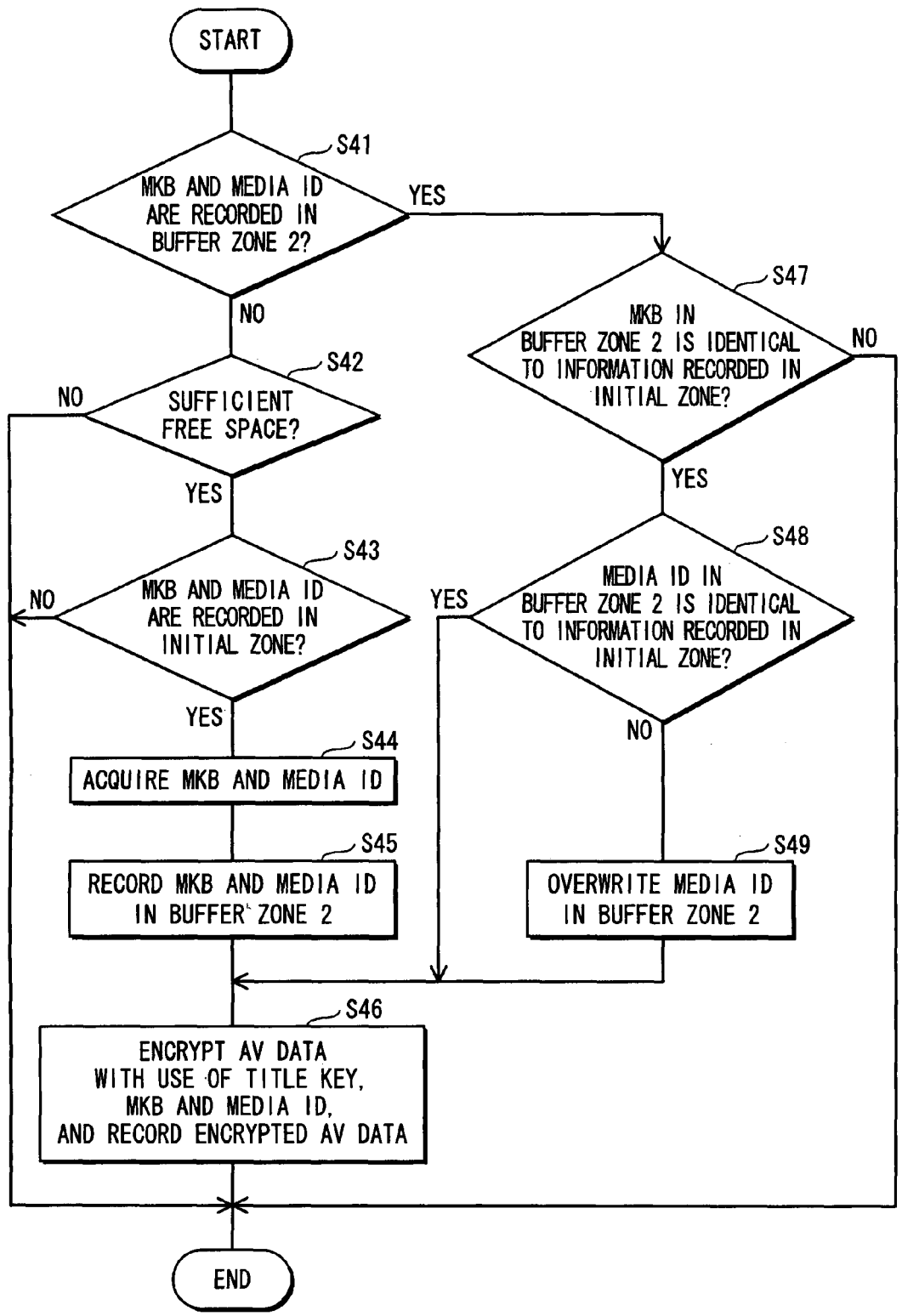
FIG. 4 is a flowchart showing processing performed by the recording device 1000.

FIG. 4 is a flowchart showing processing performed by the recording device 1000.

As shown in FIG. 4, the recording device 1000 reads the buffer zone 2 of the recording medium 2000, and judges whether the MKB and media ID are recorded therein (step S41).

If the judgment is negative (step S41:NO), the recording device 1000 judges whether a sufficient amount of free space is available in the buffer zone 2 for writing the MKB and media ID (step S42), and ends processing if the amount of free space is insufficient (step S42:NO). If a sufficient amount of free space is available in the buffer zone 2 (step S42:YES), the recording device 1000 judges whether the MKB and media ID are recorded in the Initial Zone, and ends processing if the judgment is negative (step S43:NO). If the MKB and media ID are recorded in the Initial Zone (step S43:YES), the recording device 1000 acquires the MKB and media ID from the Initial Zone (step S44). The recording device 1000 records the acquired MKB and media ID in the buffer zone 2 (step S45).

Upon completing the processing of step S45, the recording device 1000 encrypts the AV data stored in the AV pack storage unit 106, with use of the MKB, media ID, title key, etc., and records the encrypted AV data in the Data area (step S46).

Also, if the MKB and media ID have been judged in step S41 to be recorded in the buffer zone 2 (step S41:YES), the recording device 1000 reads the MKB recorded in the buffer zone 2, as well as reads the MKB validation data from the Initial Zone, and the check unit 103 verifies that the MKB recorded in the buffer zone 2 is valid (step S47).

Processing ends if the MKB is not valid (step S47:NO). If the MKB is valid (step S47:YES), the check unit 103 similarly verifies that the media ID recorded in the buffer zone 2 is valid (step S48).

If the media ID is not valid (step S48:NO), the recording device 1000 overwrites the media ID recorded in the buffer zone 2 with the media ID recorded in the Initial Zone (step S49). If the media ID is valid (step S48:YES), the recording device 1000 does not perform the overwrite processing. Thereafter, the recording device 1000 encrypts the AV data stored in the AV pack storage unit 106, with use of the MKB, media ID, title key, etc., and records the encrypted AV data in the data area (step S46). Note that as mentioned in detail in the description of the encryption unit 105, the encryption processing in step S46 is performed similarly to encryption processing in CPRM. Also, although in the above description processing ends if the MKB is not valid (step S47:NO), the present invention is not limited to this. Instead, the recording device 1000 may overwrite the MKB recorded in the buffer zone 2 with the MKB recorded in the Initial Zone. Also, although in the above description the recording device 1000 overwrites the media ID recorded in the buffer zone 2 with the media ID recorded in the Initial Zone (step S49) if the media ID is not valid (step S48:NO), the present invention is not limited to this. Instead, processing may end if the media ID is not valid.

The following describes operations performed by the playback device 3000.

Figure 5:
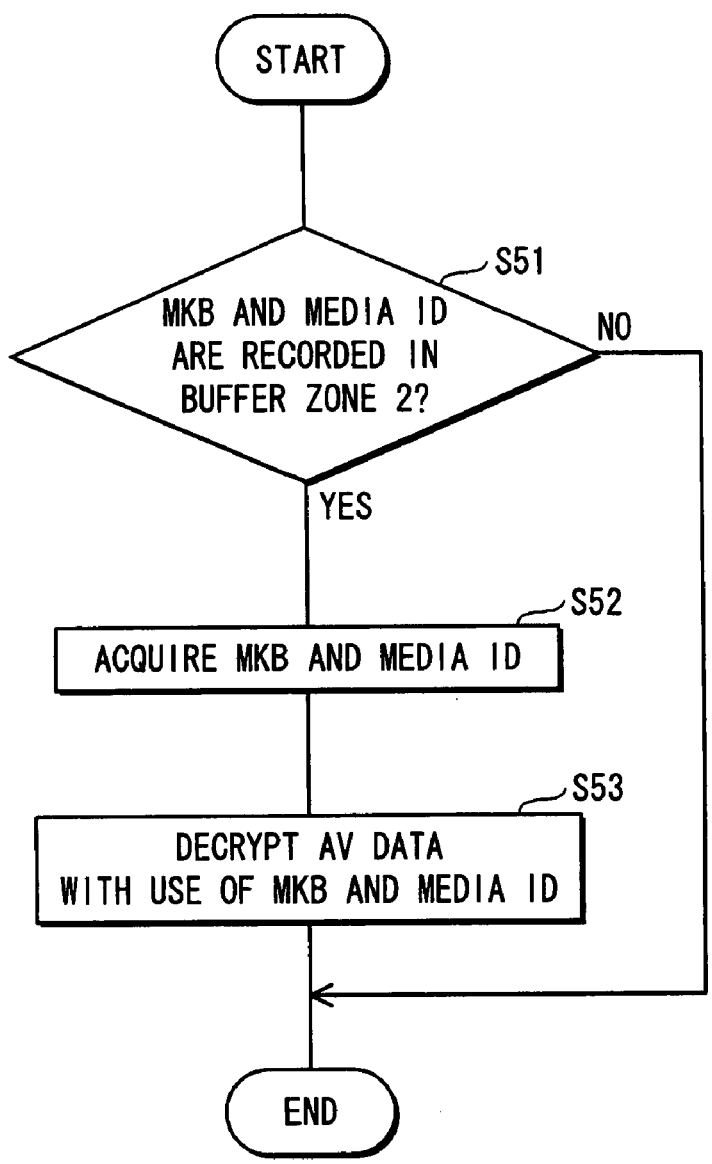
FIG. 5 is a flowchart showing processing performed by the playback device 3000.

FIG. 5 is a flowchart showing processing performed by the playback device 3000.

As shown in FIG. 5, the playback device 3000 judges whether the MKB and media ID are recorded in the buffer zone 2 (step S51). If the judgment is affirmative (step S51: YES), the playback device 3000 acquires the MKB and media ID from the buffer zone 2 (step S52).

Upon acquiring the MKB and media ID (step S52), the playback device 3000 decrypts the AV data with use of the acquired MKB and media ID (step S53).

Also, processing ends if the playback device 3000 judges in step S51 that the MKB and media ID are not recorded in the buffer zone 2 (step S51:NO).

Supplementary Remarks

Although a recording device pertaining to the present invention has been described based on the above embodiment, variations such as the following are also possible, and the present invention should of course not be limited to the recording device described in the above embodiment.

(1) Although the playback device is described as not being able to read information from the Initial Zone in the above embodiment, the present invention is not limited to this. The playback device may be able to read information from the Initial Zone.

Figure 6:
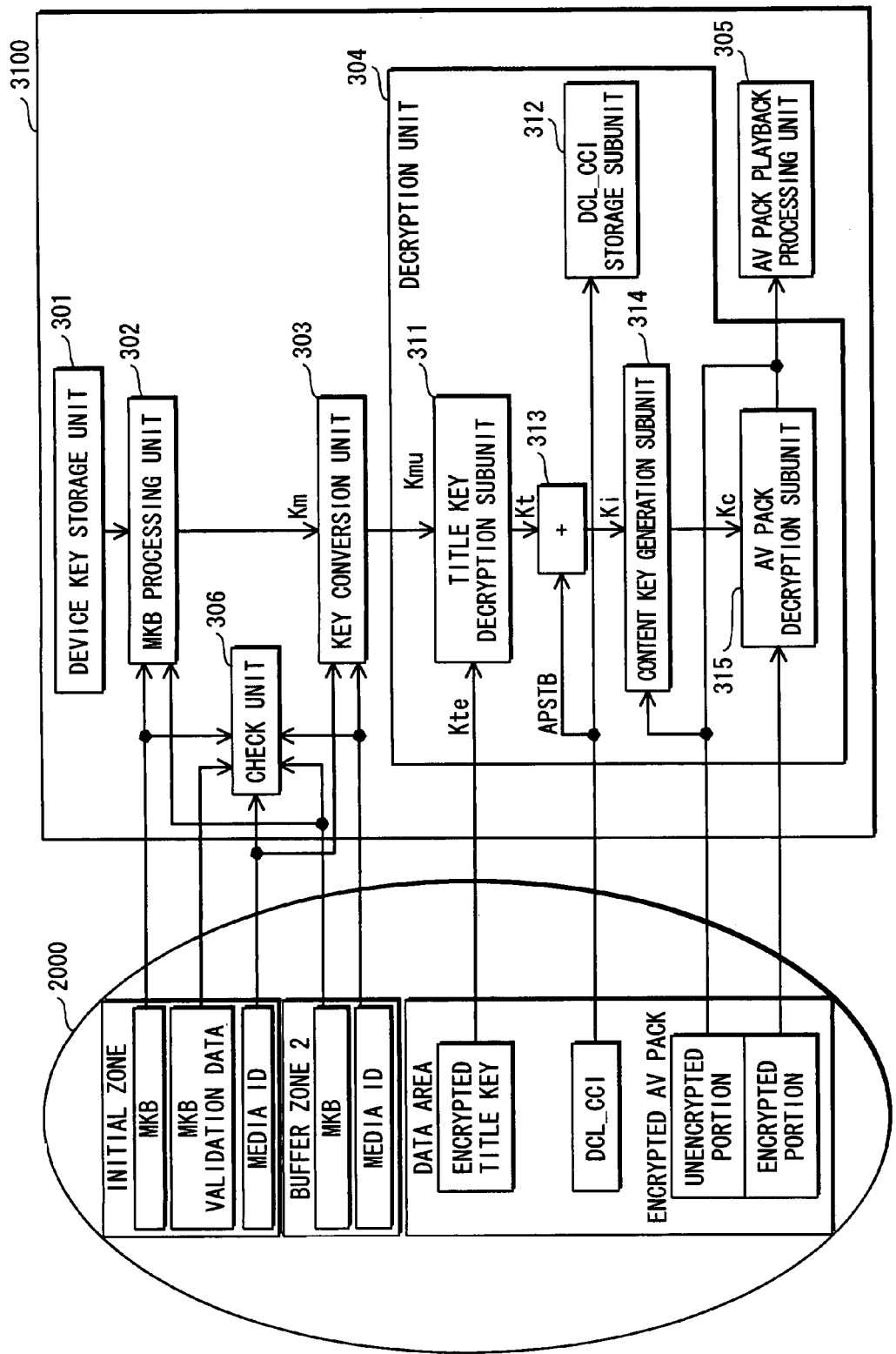
FIG. 6 is a functional block diagram showing a playback device 3100.

In this case, the playback device may, as in a playback device 3100 shown in FIG. 6, further include a check unit 306 that reads an MKB etc. from the Initial Zone and the buffer zone 2 and verifies the validity of the read MKB etc. The check unit 306 calculates a hash value for the MKB recorded in the buffer zone 2, and verifies the validity of the MKB by comparing the calculated hash value to the MKB validation data recorded in the BCA. The check unit 306 also verifies the validity of the media ID recorded in the buffer zone 2 by performing a comparison with the media ID recorded in the BCA.

This enables the playback device 3100 to verify the validity of the MKB and media ID recorded in the buffer zone 2 of the recording medium 2000.

Figure 7:
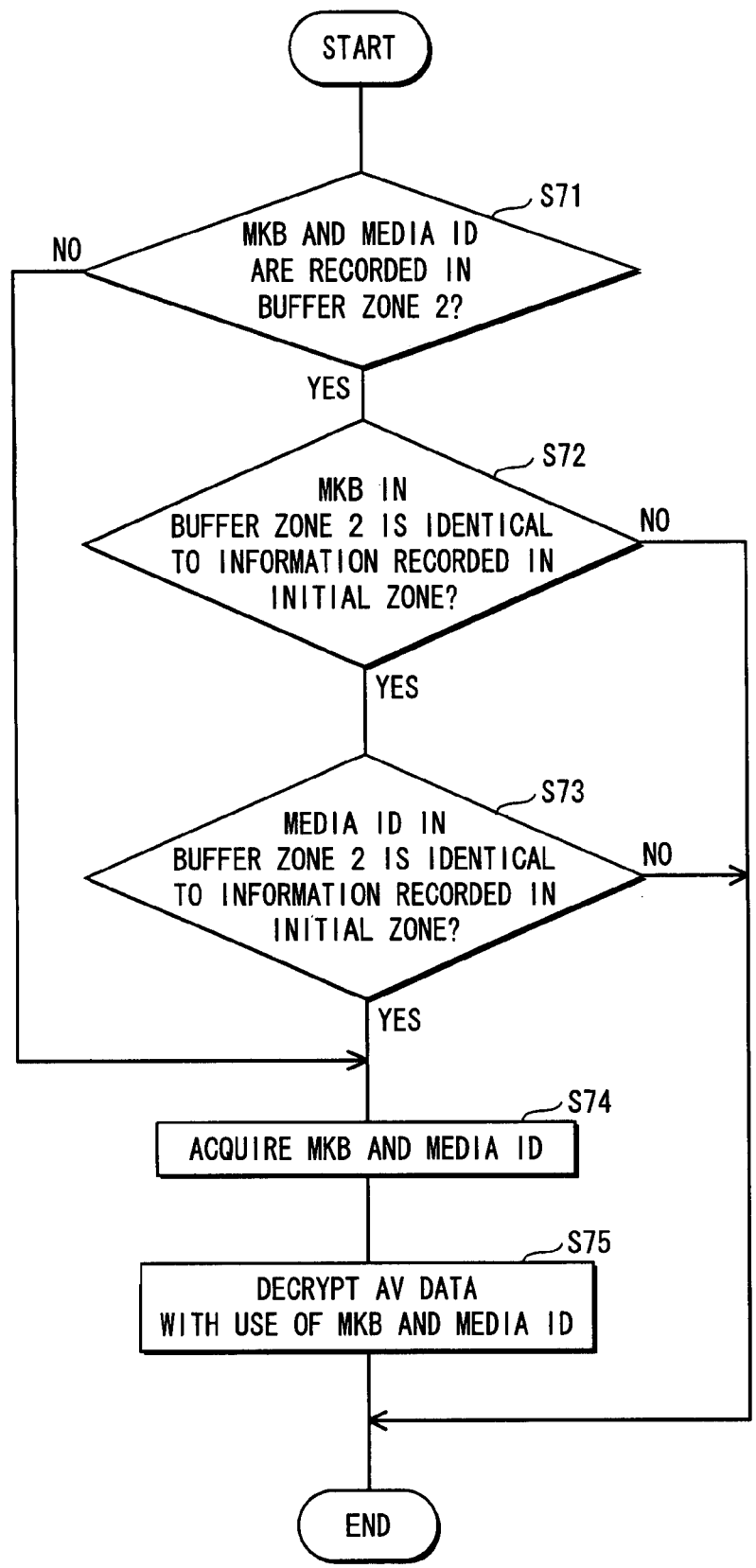
FIG. 7 is a flowchart showing processing performed by the playback device 3100.

Furthermore, the playback device 3100 may end processing such as decoding if a result of the verification is negative. FIG. 7 is a flowchart showing processing performed by the playback device 3100.

As shown in FIG. 7, the playback device 3100 judges whether the MKB and media ID are recorded in the buffer zone 2 (step S71). If the judgment is negative (step S71:NO), the playback device 3100 acquires the MKB and media ID from the Initial Zone (step S74), and decrypts the AV data with use of the acquired MKB and media ID (step S75).

If the playback device 3100 judges in step S71 that the MKB and media ID are recorded in the buffer zone 2 (step S71:YES), the check unit 306 verifies the validity of the MKB recorded in the buffer zone 2 (step S72). If the MKB recorded in the buffer zone 2 is valid, that is, if the MKB recorded in the buffer zone 2 is the same as the MKB recorded in the Initial Zone (step S72:YES), the check unit 306 similarly verifies the validity of the media ID recorded in the buffer zone 2 (step S73). If the media ID recorded in the buffer zone 2 is valid (step S73:YES), the playback device 3100 acquires the MKB and media ID from the buffer zone 2 or the Initial Zone (step S74), and decrypts the AV data with use of the acquired MKB and media ID (step S75).

Also, if the MKB or media ID recorded in the buffer zone 2 are not valid (step S72:NO or step S73:NO), processing ends without the AV data being decrypted.

Note that if the MKB or media ID recorded in the buffer zone 2 are not valid (step S72:NO or step S73:NO), processing such as decryption may be performed with use of the MKB etc. recorded in the Initial Zone.

(2) Although the recording device 1000 reads information from the Initial Zone and records the read information in the buffer zone 2 in the above embodiment, the present invention is not limited to this. Instead of the buffer zone 2, the recording device 1000 may record the read information in another area such as the data area.

Also, the information to be recorded in the buffer zone 2 may be an ADIP (Address In Pre-groove).

Also, information recorded in an area other than the Initial Zone may be recorded in the buffer zone 2 etc.

(3) Although a media ID is read and recorded in the above embodiment, the present invention is not limited to this. A media ID seed may be read and recorded. A media ID is generated by processing the media ID seed using a random number generating function.

(4) Although an exemplary case of using a DVD+RW disk compatible with CPRM is described in the above embodiment, the present invention is not limited to this. The present invention also includes cases of recording to any optical disk or other recording medium.

(5) The devices of the above embodiment and variations may be computer systems structured specifically from a microprocessor, a ROM, a RAM, a hard disk unit, a display unit, a keyboard, a mouse, etc. A computer program is stored in the RAM or the hard disk unit. The devices achieve their functions as the microprocessor operates in accordance with the computer program. Instruction code which indicates commands to the computer is structured as a combination of multiple instruction codes in order for the computer program to achieve predetermined functions.

(6) A portion or all of the constituent elements of the devices of the above embodiment and variations may be structured as a single system LSI (Large Scale Integration). A system LSI is a super multifunctional LSI manufactured by integrating a plurality of structural units onto a single chip. Specifically, it is a computer system including a microprocessor, a ROM, a RAM, and the like. A computer program is stored in the RAM. The system LSI achieves its functions as the microprocessor operates in accordance with the computer program.

(7) A portion or all of the constituent elements of the devices of the above embodiment and variations may be structured as a removable IC card or stand-alone module. The IC card or the module is a computer system including a microprocessor, a ROM, and a RAM. The IC card and the module may include the above super multifunctional LSI. The IC card and the module achieve their functions as the microprocessor operates in accordance with the computer program. This IC card or module may be tamper resistant.

(8) The present invention may be the methods shown above. Also, the present invention may be computer programs for causing computers to realize the methods, or may be digital signals representing the computer programs.

Also, the present invention may be a computer-readable recording medium such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded. The present invention may be the computer programs or the digital signals which are recorded on these recording media.

Also, the present invention may be the computer programs or digital signals which are transmitted via an electronic communications circuit, a wireless or fixed-line communications circuit, a network such as the Internet, a data broadcast, etc.

Also, the present invention may be a computer system including a microprocessor and a memory, whereby the memory stores the computer programs, and the microprocessor operates in accordance with the computer programs.

Also, the present invention may be carried out by another independent computer system by transferring the programs or the digital signals which have been recorded on the recording media, or by transferring the programs or the digital signals via the network, etc.

(9) The present invention may be any combination of the above embodiment and variations.

INDUSTRIAL APPLICABILITY

The present invention can be used in a recording device that records data such as content to a recording medium such as a DVD, for which more than one standard has been established.

The invention claimed is:

1. A playback device that reads encrypted data from a recording medium and controls an execution of decryption processing to decrypt the read encrypted data,
   wherein the recording medium includes a first area located at a first physical position and a second area located at a second physical position different from the first physical position,
   wherein decryption information is prerecorded in the first area of the recording medium before the encrypted data is recorded by a recording device, the decryption information being used to perform the decryption processing to decrypt the encrypted data,
   wherein the encrypted data is generated by encrypting, using the decryption information, data targeted for recording,
   wherein certain information is recorded in the second area of the recording medium, and
   wherein the playback device comprises:
      a determination unit including a processor operable to determine whether the decryption information recorded in the first area and the certain information recorded in the second area are identical; and
      a control unit operable, when the determination unit determines that the decryption information recorded in the first area and the certain information recorded in the second area are not identical, to execute the decryption processing to decrypt the encrypted data using the decryption information read from the first area.

2. An integrated circuit used in a playback device that reads encrypted data from a recording medium and controls an execution of decryption processing to decrypt the read encrypted data,
   wherein the recording medium includes a first area located at a first physical position and a second area located at a second physical position different from the first physical position,
   wherein decryption information is prerecorded in the first area of the recording medium before the encrypted data is recorded by a recording device, the decryption information being used to perform the decryption processing to decrypt the encrypted data,
   wherein the encrypted data is generated by encrypting, using the decryption information, data targeted for recording,
   wherein certain information is recorded in the second area of the recording medium, and
   wherein the integrated circuit comprises:
      a determination processing unit operable to perform processing to determined whether the decryption information recorded in the first area and the certain information recorded in the second area are identical; and a control processing unit operable, when the determination processing unit determines that the decryption information recorded in the first area and the certain information recorded in the second area are not identical, to execute the decryption processing to decrypt the encrypted data using the decryption information read from the first area.

3. A non-transitory computer-readable recording medium having a control program recorded thereon, the control program for causing processing to be executed by a playback device that reads encrypted data from a recording medium and controls an execution of decryption processing to decrypt the read encrypted data,
   wherein the recording medium includes a first area located at a first physical position and a second area located at a second physical position different from the first physical position,
   wherein decryption information is prerecorded in the first area of the recording medium before the encrypted data is recorded by a recording device, the decryption information being used to perform the decryption processing to decrypt the encrypted data,
   wherein the encrypted data is generated by encrypting, using the decryption information, data targeted for recording,
   wherein certain information is recorded in the second area of the recording medium, and
   wherein the control program causes a computer to execute a method comprising:
      determining whether the decryption information recorded in the first area and the certain information recorded in the second area are identical; and
      executing, when the determining determines that the decryption information recorded in the first area and the certain information recorded in the second area are not identical, the decryption processing to decrypt the encrypted data using the decryption information read from the first area.

* * * * *